United States Patent [19]

Manganaro et al.

[11] 3,944,548
[45] Mar. 16, 1976

[54] PROCESS FOR RECOVERY OF CYANURIC ACID FROM CHLORINATOR MOTHER LIQUOR

[75] Inventors: James L. Manganaro, New York, N.Y.; Richard W. Cummins, Cranbury; Raymond A. Olson, Westfield, both of N.J.

[73] Assignee: FMC Corporation, New York, N.Y.

[22] Filed: Feb. 15, 1974

[21] Appl. No.: 443,113

[52] U.S. Cl............................ 260/248 A; 204/158 S
[51] Int. Cl.².................................... C07D 251/28
[58] Field of Search.................... 260/248 A, 248 C; 204/158 S, 158 AA

[56] References Cited
UNITED STATES PATENTS

| | | | |
|---|---|---|---|
| 3,107,244 | 10/1963 | Robertson | 260/248 |
| 3,296,262 | 1/1967 | Scott | 260/248 |
| 3,835,136 | 9/1974 | Hirdler et al. | 260/248 |
| 3,846,424 | 11/1974 | Hirdler et al. | 260/248 |

OTHER PUBLICATIONS

Chattaway et al., *J. Chem. Soc.*, Vol. 81, pp. 191–202, (1902).

*Primary Examiner*—John M. Ford
*Attorney, Agent, or Firm*—Thomas B. Graham

[57] ABSTRACT

A process for recovering cyanuric acid values and chlorine from the effluent mother liquor occurring in the preparation of an alkali metal or alkaline earth metal salts of dichloroisocyanurate or dichloroisocyanuric acid or trichloroisocyanuric acid, the foregoing recovery process comprising reacting dichloroisocyanurate acid or trichloroisocyanuric acid present in the foregoing effluent with a strong mineral acid.

7 Claims, No Drawings

PROCESS FOR RECOVERY OF CYANURIC ACID FROM CHLORINATOR MOTHER LIQUOR

Dichloroisocyanuric acid, trichloroisocyanuric acid and alkali metal and alkaline earth metal salts of dichloroisocyanuric acid, as well as hydrates, complexes or mixtures thereof, are recognized sources of available chlorine in solid bleach and detergent compositions. The most popular of these are sodium dichloroisocyanurate and potassium dichloroisocyanurate.

One method employed for preparing the foregoing chlorinated isocyanurate salts is described in U.S. Pat. No. 3,035,056. The process there disclosed involves, illustratively, reacting chlorine and an isocyanurate of an alkali metal, for example, sodium, potassium, or mixtures thereof, in an aqueous medium at a temperature in the range of 0°C to 60°C; the addition of reactants being substantially stoichiometric in a preferred embodiment and occuring at a pH of 6.0 to 8.5. The desired chlorinated alkali metal isocyanurate is recovered as a water wet solid by standard means such as filtration, decantation, centrifugation or the like. The patent suggests discarding the mother liquor effluent or, alternatively, subjecting it to vacuum concentration to remove a substantial amount of the water in order to induce precipitation of additional amounts of the product salts which are dissolved in the water. The remaining effluent, with its cyanuric acid values, active chlorine and chloride anion is then discarded resulting, not only in an obvious waste of those values, but particularly in terms of the nitrogen content of these values, a pollution problem as well.

A further method described in U.S. Pat. No. 3,299,060 involves the reaction of chlorine with an alkali metal hydroxide and isocyanuric acid as a slurry in an aqueous medium at a pH of from about 6 to 7 and a temperature of about 5°C to 65°C to form the desired alkali metal dichloroisocyanurate. This method involves recovery of further product salt by filtration of the effluent and recycling of part of the effluent remaining as aqueous reaction medium.

U.S. Pat. 2,969,360 describes the preparation of chlorinated cyanuric acids involving in a first zone the reaction of cyanuric acid, aqueous alkali and a stream of chlorine at pH maintained between 5 and 9 and withdrawal from the first zone of a portion of the reaction mixture to a second zone in which the pH is maintained at 1.5 to 3.5. The desired dichlorocyanuric acid and trichlorocyanuric acid products are retrieved from the second zone. The pH achieved by this process, using chlorine addition alone, is however insufficient to effect recovery of the significant amounts of cyanuric acid values remaining in the reaction mixture.

IN the U.S. Pat. 3,501,468 there is disclosed, additionally, the chlorination of cyanuric acid and a mixture of sodium and potassium hydroxide to form chloroisocyanurate complex compounds such as [(monotrichloro) tetra-(monopotassiumdichloro)] pentaisocyanurate and (monotrichloro) (monopotassiumdichloro) diisocyanurate.

The primary object of this invention is to provide a process for recovery of cyanuric acid from the effluent mother liquor resulting from production of salts of chlorinated isocyanuric acid.

Another object is to provide a process which allows the recovery of chlorine values present in the foregoing waste mother liquor.

A further object is to provide a method which is substantially inexpensive in operation and capable, additionally, of ready application to existing plant facilities.

Various other objects and advantages of this invention will be apparent from the detailed description appearing hereinafter.

It has now been discovered, accordingly, that it is possible to recover cyanuric values, as well as active chlorine values, from the waste mother liquor resulting from the production of alkali metal and alkaline earth metal salts of chlorinated isocyanuric acid, and dichloroisocyanuric acid and trichloroisocyanuric acid, as well as complexes, hydrates or mixtures thereof, obtained by chlorination of the isocyanuric acid or its corresponding alkali metal and alkaline earth metal isocyanurates; the recovery being effected by reaction of the chlorinated isocyanuric acid values present in the solution of aqueous effluent with a strong mineral acid, to convert chlorinated isocyanuric acid values to cyanuric acid values and to remove available chlorine from solution. The cyanuric acid values, which are less soluble than the corresponding dichloroisocyanuric acid, its salts or trichloroisocyanuric acid in the saline solution constituting the effluent, precipitate out of solution and are recovered by conventional techniques such as, for example, filtration. The gaseous chlorine resulting from the foregoing reaction is also recovered by standard procedures well known to those skilled in the art.

In the process of producing dichloroisocyanuric acid, trichloroisocyanuric acid or the alkali metal or alkaline earth metal salt of dichloroisocyanuric acid, as well as hydrates, mixtures or complexes thereof by chlorination of the corresponding salt or mixtures of salts in an aqueous reaction medium maintained at a pH of about 2 to about 8.5 and at a temperature of from about 5°C to 100°C, the chlorinated isocyanuric acid or the salt is precipitated from the reaction mixture as a crystal. The effluent mother liquor remaining is then, in an additional step and according to the present invention, contacted by a strong mineral acid to induce pH in the range of about 0.5 to about 0.8 in the mother liquor and effect removal of cyanuric acid values therefrom. The most prominent reaction in this step is the conversion of dichloroisocyanuric acid to cyanuric acid, which is precipitated from the mother liquor within the foregoing pH range, with the conversion of available chlorine to gaseous chlorine, which is evolved and removed and may be introduced into the process of producing the desired chlorinated isocyanurate.

The chlorination process can produce a mother liquor containing, for example, any of the following: trichloroisocyanuric acid, dichloroisocyanuric acid, potassium dichloroisocyanurate acid, sodium dichloroisocyanurate. The process of this invention recovers the cyanuric values from any chlorinator mother liquor as long as it contains Cl— and OCl— or HOCl.

The term "alkali metal salts" as employed herein is understood to encompass not only sodium and potassium salts of the acids specified but, by way of illustration, those of lithium and cesium, as well. The term "alkaline earth metal salts" is intended, in like manner, to include within its scope, for example, the barium, magnesium and calcium salts of the particular acids recited.

The inorganic acids employed in accordance with the invention, and characterized generally as strong mineral acids are those inorganic acids which dissociate more strongly than acetic acid, i.e., having a dissociation constant greater than that of acetic acid.

These mineral acids include sulfuric acid, nitric acid, nitrous acid, hydrochloric acid, and although less preferred, phosphoric acid. The most desirable, as indicated, for use according to the invention are hydrochloric acid and sulfuric acid.

while it is not intended that any particular theory or principle by which the objectives of this invention are achieved be relied upon, it is believed that the function of the mineral acid on the waste liquor may be explained by the following series of equations in which dichloroisocyanuric acid is referred to as DCCA and cyanuric acid as CA:

1(a) $DCCA + 2H_2O \rightleftharpoons CA + 2HOCl$

1(b) $2HOCl + 2H^+ + 2Cl^- \rightarrow 2H_2O + 2Cl_2$

The overall reaction may be expressed as follows:

(2) $DCCA + 2H^+ + 2Cl^- \rightarrow CA + 2Cl_2$

The Cl ion normally is present as a result of the prior chlorination reaction and, its concentration may be enhanced, if desired, by HCl, NaCl or other Cl ion sources. If no Cl ion is present it may be added to the waste liquor.

With proper notation in the equations above, the equilibrium apply to trichloroisocyanuric acid.

According to this theory or principle the addition hydrochloric acid, used illustratively in the foregoing equations, induces the formation of chlorine as a result of the reaction of the hydrochloric acid agent with the hypochlorous acid existing in equilibrium in equation 1(a). Removal of this chlorine drives the equilibrium of each of the foregoing equations to the right, with the resulting formation of increased concentrations of cyanuric acid in equation 1(a) as well as further gaseous chlorine in equation 1(b), and an overall reaction, as indicated, in equation (2).

In order to secure precipitation of cyanuric acid from the effluent, it is most desirable that the pH be within the range of about 0.5 to 0.8 as described above, for it is within this range that the cyanuric acid produced manifests a solubility lower than that of dichloroisocyanuric acid and will separate out of solution at the concentrations that the cyanuric acid normally attains, which is in the range of 0.3 to 2% by weight in the foregoing mother liquor, and under the other operative conditions obtaining in the reactor; namely, the concentration of the alkali metal or alkaline earth metal chlorides, or mixtures thereof, present in the aqueous medium of the effluent, usually about 6% to 10% by weight of the total effluent, and at a temperature within the range of 10°C to 40°C and usually about 25°C.

Maintenance of the pH within the parameters of 0.5 to 0.8 provides a ratio of about 2.0 to 4.0 of mineral acid equivalents per mole of cyanuric acid. At pH below 0.5 the process consumes unnecessary amounts of acid; at pH above 0.8 the reaction is slowed; but pH range from 0.2 to 1.2 is operative.

The recovery process is undertaken in a closed reaction vessel at a pressure which is not narrowly critical, and may, for example, be atmospheric, one of reduced pressure or that resulting from an air sparge of the reaction vessel during the recovery reaction. While not critical to the result secured, therefore, the use of reduced pressure, e.g. as little as 0.7 psia, has been found to be preferred.

A batch or continuous operation is feasible so long as an effective residence time for reaction of mineral acid and effluent of at least 0.2 hours and, preferably no more than 2.0 hours, in the reactor alone, or in combination with a product receiver vessel, is achieved. Long retention is not favored for it represents hold up in processing; hence, the shortest period in which the reaction can be completed is desired.

The cyanuric acid precipitated in the reactor or, if desired, in a separate product recovery vessel, is removed as indicated, in the form of a slurry to a solid-liquid separation vessel, e.g. filter, centrifuge, or the like, wherein the cyanuric acid is recovered in crystalline form.

Thus after the recovery reaction with mineral acid has run its course, or has been otherwise terminated, the pH of the reaction vessel having been maintained at between 0.5 to 0.8 for a period of from 0.2 or, if desired, 0.5 to 2.0 hours, the solid cyanuric acid values are recovered by filtration of the reactor effluent. The gaseous chlorine is also removed and the filtrate, from which cyanuric acid values and chlorine have been removed, may be discarded.

The range of recovery of cyanuric acid has been found to be enhanced materially by the use of ultrasonic energy within the reaction vessel during the period in which the mineral acid is present therein. While not intending to be limited to any particularly theory of operation, it would appear that this enhancement of the recovery process according to the invention results from the acceleration in separation of chlorine gas from the reaction mixture to which the mineral acid has been added with consequent cyanuric acid formation. The increase in the rate of evolution of gaseous molecular chlorine may, in turn, be attributed, according to this theory, to cavitation at the surface of the crystals of chlorinated isocyanuric acid present in the reaction product mixtures. The equipment used to effect the ultrasonic input is any conventional industrial ultrasonic apparatus or, in any event, one that is capable of producing cavitation and high level turbulence and shear. Typically, such apparatus is functional in its application to slurries as well as solutions. Capacities of up to 80 gallons per minute are available.

The following examples are further illustrative of the invention. In these examples all parts and percentages (%) are by weight unless otherwise expressly indicated.

EXAMPLE I

This example illustrates the recovery of cyanuric acid according to the invention.

Three kilograms of synthetically prepared dichloroisocyanuric acid mother solution which synthetic mixture results typically from the reaction in an aqueous solution at a pH 2.0 to 3.5 of substantially stoichiometric amounts of chlorine and disodium isocyanurate and having the following listed analysis, was fed to a reactor at a steady rate of 39 cubic centimeters per minute (cc/min.):

Analysis:
2.3% (or 69 grams) dichloroisocyanuric acid
10.0% (or 300 grams) NaCl
87.7% (or 2631 grams) H$_2$O The reactor was a 1000 cubic centimeter reaction pot sealed for operation at reduced pressure. The working volume was about 550 cubic centimeters. A magnetic stirrer was used to agitate the reactor contents. In this example both the reactor and product receiver vessel (to which the reactants were transferred when the addition of reactants was completed) were maintained at reduced pressure. Agitation did not, however, take place in the product receiver vessel.

The operating conditions are listed in Table I as follows:

Table I

|  | Reactor | Product Receiver Vessel |
| --- | --- | --- |
| Temperatures, °C | 26 | 25 |
| pH | 0.6 | 0.6 |
| Residence time, min. | 14 | 56 |
| Pressure, pounds per square inch absolute (psia) | 6.2 | 3.9 |

The mole ratio of HCl used to cyanuric acid fed to the reactor was found to be 3.85 (theory is 2.0). The amount of dried but unwashed cyanuric acid recovered was 29.0 grams which assayed 98.4% cyanuric acid and has an available chlorine content of 1.5%. This represents a recovery of 63%. The filtrate (3000 grams) analyzed 0.5% cyanuric acid and 0.028% available chlorine. Thus 33.3% of the cyanuric acid values were in the filtrate. Efficiency of the process may be increased by increased residence time.

EXAMPLE II

This example illustrates the recovery of cyanuric acid in a manner similar to that recited in Example I but under slightly varied conditions of temperature and pressure.

In this example the amount, feed rate and composition of dichloroisocyanuric acid containing mother liquor was the same as described in Example I. The operating conditions are recited in Table II as follows:

Table II

|  | Reactor | Product Receiver Vessel |
| --- | --- | --- |
| Temperature, °C | 26 | 12 |
| pH | 0.62 | 0.62 |
| Residence time, min. | 14 | 56 |
| Pressure, psia | 2.1 | 2.1 |

The mole ratio of hydrochloric acid to cyanuric acid was found to be 3.2 (theory is 2.0). After acidification at the conditions given above, the precipitated cyanuric acid was filtered off and dried. This precipitate is reported upon in Table III appearing hereinafter. The filtrate was analyzed and found to have 0.56% cyanuric acid and 0.07% available chlorine.

Table III

| Wt., grams | 26.3 |
| --- | --- |
| %CA* | 99.6 |
| Wt. of CA* in solids, grams | 26.2 |
| % Average Chlorine | 1.8 |

*cyanuric acid

The remaining cyanuric acid values remained in the filtrate. No cyanuric acid was decomposed.

EXAMPLE III

This example illustrates the recovery of cyanuric acid according to the invention at a pressure varying from that of Examples I and II.

In this example the amount, feed rate and composition of the dichloroisocyanuric acid containing mother liquor was the same as described in Example I. The reactor was also the same as in Example I except that in this case the run was performed under the conditions appearing in Table Iv and which vary materially from those of Example I only in the pressures and temperatures employed in the reactor and product receiver vessel.

Table IV

|  | Reactor | Product Receiver Vessel |
| --- | --- | --- |
| Temperature, °C | 28 | 10 |
| pH | 0.65 | 0.65 |
| Residence time, min. | 14 | 56 |
| Pressure, psia | 14.7 | 14.7 |

The mole ratio of HCl used to cyanuric acid fed was found to be 2.49 (theory is 2.0). The amount of unwashed but dried cyanuric acid recovered was 23.9 grams assaying 95.0% cyanuric acid and having 4.3% available chlorine. This represents a recovery of 50.5%. The cyanuric acid values not recovered were lost as soluble cyanuric acid in the filtrate.

EXAMPLE IV

This example illustrates the practice of the invention replacing the concentrated hydrochloric acid of the prior examples with concentrated sulfuric acid.

In this example, the amount, feed rate and composition of synthetically derived dichloroisocyanuric acid containing mother liquor was the same as described in Example I. The reactor was also the same as previously described. Concentrated $H_2SO_4$ (96%) replaced the hydrochloric acid.

The operating conditions employed were as recited in Table V:

Table V

|  | Reactor | Product Receiver Vessel |
| --- | --- | --- |
| Temperature, °C | 26 | 26 |
| pH | 0.65 | 0.65 |
| Residence time, min. | 14 | 56 |
| Pressure, psia | 0.77 | 0.77 |

The mole ratio of concentrated $H_2SO_4$ to cyanuric acid content was found to be 1.7 (theory is 1.0). The amount unwashed but dried cyanuric acid recovered was 30.8 grams and assayed 97.8% cyanuric acid and its sodium salt. This represents an initial recovery of 67.0%. The cyanuric acid values lost were lost as soluble cyanuric acid in the filtrate.

EXAMPLE V

This example illustrates the practice of the invention incorporating mother liquor composition containing potassium dichloroisocyanurate and potassium chloride.

In this example, the amount of synthetically prepared but typical dichloroisocyanuric acid containing mother liquor was the same as in Example I. The equipment utilized was also the same. The synthetic mother liquor differed from that of Example I, however, in having the following compositions:

| | |
|---|---|
| potassium dichloroisocyanurate | 2.74% or 82.32 grams |
| potassium chloride | 11.93% or 357.9 grams |
| hydrochloric acid | 1.14% or 34.2 grams at 37% concentration |
| water | 84.19% or 2525.7 grams |

The foregoing mixture is typical of that which would result if chlorination to produce dichloroisocyanuric acid were performed with a feed containing potassium hydroxide instead of sodium hydroxide. The mole ratio of potassium hydroxide to cyanuric acid was 2 to 1 respectively. The foregoing mother liquor composition was treated with hydrochloric acid in a mole ratio of this latter acid to cyanuric acid of 3.51 to 1 respectively (theory is 2.0 to 1 respectively). The feed rate to the reactor vessel of mother liquor composition was 102 milliliters per minute. The operating conditions were as recited in Table VI.

Table VI

| | Reactor | Product Receiver Vessel |
|---|---|---|
| Temperature, °C | 19 | 15 |
| pH | 0.5 | 0.5 |
| Residence time, min. | 5.4 | 21.4 |
| Pressure, psia | 0.77 | 0.77 |

The amount of dried cyanuric acid recovered was 19.0 grams which analyzed for a content of 98.3% cyanuric acid. This represented a recovery of 41.5%. The cyanuric acid values lost were lost as soluble cyanuric acid in the filtrate.

EXAMPLE VI

This example illustrates the utilization of ultrasonic energy as an adjunct to treatment of a synthetically compounded but otherwise typical diisocyanuric acid waste liquor feed with a strong mineral acid according to the invention.

A solution of synthetic dichloroisocyanuric acid waste stream typical both as to composition and percentages of components was prepared having the following constitution:

| | |
|---|---|
| Dichloroisocyanuric acid | 6.9 grams (2.3%) |
| NaCl | 30.0 grams (10%) |
| HOH | 263.1 grams (87.7%) |

This solution was then divided into 4 approximately equal portions, 2 of which were treated with concentrated sulfuric acid to effect a pH of 0.5. In like manner the remaining two were treated with HCl to effect a pH of 0.5. One of the sulfuric acid treated and one of the hydrochloric acid treated portions or samples were then placed in a 100 watt Bransonic Ultrasonic Cleaner for 4 minutes. All four samples were then filtered and the filtrate analyzed for dissolved cyanuric acid. The total length of time before filtering each of the samples was less than 1 hour. All solutions were maintained at room temperatures.

The result secured in each instance is shown in Table VII which follows:

Table VII

| | | With or Without Ultrasonic Energy | %CA* In Solution | |
|---|---|---|---|---|
| Run | Acid | | Originally | After Described Treatment |
| 1 | conc H$_2$SO$_4$** | without | 1.5 | 1.28 |
| 2 | conc H$_2$SO$_4$** | with (4 minutes) | 1.5 | 0.428 |
| 3 | conc HCl** | with | 1.5 | 1.35 |
| 4 | conc HCl** | with (4 minutes) | 1.5 | 0.741 |

*cyanuric acid and sodium salt thereof.
**sample filtered through fine porosity funnel.

It will be seen from the results of this Example VI that ultrasonic vibrations applied to the acid treated waste stream will accelerate appreciably the rate of recovery of cyanuric acid therefrom.

It will be evident that the terms and expressions which have been employed are used as terms of description and not of limitation. There is no intention in the use of such terms and expressions of excluding equivalents of the features shown and described or portions thereof and it is recognized that various modifications are possible within the scope of the invention claimed.

What is claimed is:

1. In a process which comprises
    contacting a strong mineral acid with an aqueous effluent mother liquor resulting from chlorination of isocyanuric acid or salts thereof selected from the group alkali metal isocyanurates and alkaline earth metal isocyanurates, and complexes and mixtures thereof, in an aqueous medium maintained at a pH of from about 2 to about 8.5 and from which the resulting chlorinated isocyanurate product has been removed in crystalline form,
    the improvement comprising adding concentrated strong mineral acid from the group hydrochloric and sulfuric in amounts sufficient to induce rapidly a pH of about 0.2 to about 1.2 in said mother liquor, thereby to convert soluble chlorinated isocyanuric acid values to cyanuric acid values, and to remove available chlorine from solution, and to form a slurry containing as a solid therein, cyanuric acid precipitated from solution in said mother liquor,
    said operation being carried out at a temperature in the range of 5°C to 100°C for a period of at least 0.2 hour.

2. The process of claim 1 wherein the cyanuric acid present in said slurry is removed from contact with said mother liquor.

3. The process of claim 1 wherein said chlorinated salt of isocyanuric acid is the sodium salt thereof.

4. The process of claim 1 wherein said chlorinated salt of isocyanuric acid is the potassium salt thereof.

5. The process of claim 1 wherein said chlorinated salt of isocyanuric acid is a mixture of the complexes thereof.

6. The process of claim 1 wherein the reaction of said mineral acid in said mother liquor is undertaken at reduced pressure.

7. The process of claim 1 wherein said contact proceeds under the influence of ultrasonic vibration.

* * * * *